2,886,890

Patented May 19, 1959

2,886,890

DENTURE AND PROCESS OF MAKING

Hermann Schnell, Leverkusen, Germany, assignor to Farbenfabriken Bayer Aktiengesellschaft, Leverkusen, Germany, a corporation of Germany No Drawing. Application May 6, 1952
Serial No. 286,424

Claims priority, application Germany May 10, 1951

11 Claims. (Cl. 32—2)

The present invention relates to improvements in artificial dentures.

Artificial dentures prepared from plastics, especially from polymethyl methacrylates, have the advantage of physiological and chemical indifference, good compatibility with the tissues of the mouth, good mechanical properties and appearance.

It is desired in many cases to provide the surface of the denture which is permanently in contact with the tissues of the mouth with a lining of a soft material which, due to its resilience, does not irritate the tissues of the mouth. Furthermore, such a lining gives the denture an accurate fit in the mouth, thus preventing foodstuffs from penetrating between the denture and the tissue, and improves the adhesion of the denture to the tissue. For producing dentures having soft linings, it has been proposed to mechanically remove a thin layer from that portion of the dental plate which is in contact with the tissues of the mouth and to provide that part with a plastic containing a plasticizer. For this purpose a denture is coated, for instance with polymethyl methacrylate containing a dimethyl phthalate, in a suitable mold by application of pressure under the conditions usually employed in the preparation of artificial dentures, e.g. by applying slight pressure and heating to temperatures up to 100° C. It is necessary for the above-described plastics containing plasticizers to contain a high proportion of a plasticizer, which may often amount to more than 50% of the total weight, in order to obtain the required softness and resilience of the lining and to secure uniform flowing in the mold. In the course of use the plasticizer is leached out by the fluid of the mouth. In consequence thereof the lining becomes hard and porous and forms a breeding place for bacteria, apart from the fact that the leached plasticizer entailed disagreeable physiological effects.

In accordance with the present invention artificial dentures with soft, resilient, strongly adherent linings are obtained by a simple and convenient process in the absence of plasticizers.

In carrying out the process of the present invention plates or foils of a soft, resilient plastic are soaked with a monomer or a monomeric mixture capable of swelling the plastic plate or foil. The easily moldable plate, plasticized in this way by the polymerizable vinyl compounds, is applied in the mold to the gum-engaging portion of the dental plate, which has previously been recessed to receive the lining, and the polymerizable vinyl compounds are caused to polymerize, preferably with the application of pressure and heat and in the presence of polymerization catalysts. In this manner, soft, resilient linings are obtained which conform exactly to the surface of the mold.

The principal feature of the invention consists in converting a soft, resilient plastic plate or foil, by swelling it in polymerizable vinyl compounds, into a soft, moldable condition which permits of molding and shaping the plate or foil under the conditions of pressure and temperature usually employed in dentistry, and subsequently polymerizing the monomers or monomeric mixtures previously incorporated as plasticizers so that the end product thus obtained represents a soft, resilient plastic material which is very suitable for making artificial dentures without the incorporation of plasticizers being necessary.

The plates or foils employed for carrying out the process of the invention may be prepared from soft, resilient plastic materials obtained by polymerization or polycondensation. Especially suitable for this purpose are copolymers derived from vinyl components, e.g. methyl methacrylate, which when polymerized as such yield hard plastics, and at least one other vinyl component which when polymerized as such yields soft plastics, such as aliphatic acrylates the alcohol radical of which has 1 to 15 carbon atoms and methacrylates the alcohol radical of which has 4 to 15 carbon atoms for instance, ethyl acrylate, butyl acrylate, hexyl acrylate, octyl acrylate, isobutyl methacrylate, isohexyl methacrylate, octyl methacrylate, and n-lauryl methacrylate. It is of advantage to employ plates or foils prepared from cross-linked copolymers, for instance those obtained by the complementary use of polyfunctional vinyl compounds such as divinyl benzene, glycol diacrylate, glycol dimethacrylate, butanediol dimethacrylate, and hexanediol dimethacrylate.

The same monomers or monomeric mixtures as were used for making the soft, resilient plate are preferably employed as monomeric, polymerizable vinyl compounds for swelling the plates and foils. It is also possible, however, to use different monomers or monomeric mixtures provided that they are capable of swelling the soft, resilient plate and, furthermore, provided that the polymer formed during polymerization is compatible with the plastic material of the plate and ensures good adhesion to the plastic material of the denture. Examples of monomeric polymerizable vinyl compounds are methacrylates such as methyl methacrylate, ethyl methacrylate, butyl methacrylate, and isohexyl methacrylate, and acrylates such as methyl acrylate, ethyl acrylate, butyl acrylate and octyl acrylate. Suitable choice of the monomers or monomeric mixtures permits of controlling the softness of the lining in any desired direction and of attaining good adhesion to the plastic material of the denture. Strong adhesion between artificial dentures consisting of polymethyl methacrylate, which is predominantly used in the art for making dental prostheses, and the lining is brought about by using the following monomers as swelling media for the soft, resilient plates: methyl methacrylate, butyl methacrylate, isobutyl methacrylate, isohexyl methacrylate, and mixtures of methyl methacrylate and acrylates, for instance methyl acrylate, ethyl acrylate, isohexyl acrylate and dodecyl acrylate, which have a higher content of methyl methacrylate than 50%. A good adhesion between the soft plates and polymethyl methacrylate prostheses may further be achieved with other monomers and monomeric mixtures, especially those derived from more than two components. It is advantageous to incorporate polyfunctional vinyl compounds such as are described above into the monomers or monomeric mixtures employed for the swelling action. In this way soft, resilient linings which are distinguished by especially useful properties, for instance high resilience, low water adsorption and high mechanical strength are obtained after polymerization. The present invention does not, of course, exclude the possibility of adding to the plates or to the monomers dyestuffs, pigments, plasticizers, resins, filling materials and the like.

The compounds required for accelerating polymerization of the monomers in the swollen plastic plates can be dissolved in the monomers or monomeric mixtures employed for swelling the plates prior to the swelling action. They may also be incorporated into the plates, for instance by placing over the foil of the soft resilient plastic a second foil which is superficially impregnated with the polymerization catalyst, and producing a homogeneous plate containing the catalyst by pressing the two foils together. Suitable polymerization catalysts include peroxides such as benzoyl peroxide, p-chlorobenzoyl peroxide and cumene hydroperoxide. Furthermore, the known redox systems, such, for instance, as combinations of peroxides and reducing agents, for instance trihexyl amine and p-toluene sulphinic acid, are suitable as polymerization catalysts. In the latter case it is advantageous to incorporate one component of the redox system, e.g. the oxidation agent, into the plates, while the other component, e.g. the reducing agent, is added to the monomers for swelling the plates.

The quantity of the monomers or monomeric mixtures employed for swelling the soft, resilient plates is controlled in such a manner that the plate is rendered sufficiently moldable to allow of easy shaping in the mold. Generally 20 to 50% calculated on the weight of the plate to be swollen suffices to bring about the desired effect.

The process of the invention is further illustrated by the following examples, in which the parts given are parts by weight:

*Example 1*

To line a full, lower denture of polymethyl methacrylate, the dental plate is embedded upside down into gypsum placed in a mold after making an impression as usual, and an about 1 mm. thick layer of the gum-engaging portion of the denture is cut away to form a recess for receiving the liner. An appropriately shaped piece is cut away from a 1 mm. thick, soft, resilient plastic plate prepared from a co-polymer of 35 parts of methyl methacrylate, 64.2 parts of butyl acrylate and 0.8 part of ethylene glycol dimethacrylate, and over this piece a monomeric mixture consisting of 57 parts of methyl methacrylate, 40 parts of butyl acrylate and 3 parts of ethylene glycol dimethacrylate is poured in a flat dish. 5 cc. of the monomeric mixture, in which 0.1 gram of benzoyl peroxide are dissolved, are employed per plate of 12.5 grams weight. The monomers are absorbed by the plate within a few minutes. The resultant soft, resilient plate is placed upon the trimmed portion of the dental plate and covered with a sheet of cellophane. Thereupon the dental mold is closed and pressure is applied. Because it flows easily, the excess material can be completely removed from the mold. Polymerization is performed as usual on the water bath at 70° C. for half an hour and at boiling temperature for another half hour. After removing from the mold a dental plate with a strongly adhering, soft, resilient lining is obtained which shows no rise of the bite and the contour of which exactly fits the mold.

*Example 2*

A full lower denture is provided with a soft, resilient lining as described in Example 1. A 1 mm. thick plate of a co-polymer derived from 35 parts of methacrylate, 64 parts of butyl acrylate and 1 plate of glycol dimethacrylate is employed as the soft, resilient plate. This plate is swelled by means of a monomeric mixture of 40 parts of ethyl acrylate and 60 parts of methyl methacrylate, in which 0.1 gram of p-chlorobenzoyl peroxide has been dissolved per 5 cc. of the mixture, 5 cc. of the monomeric mixture being used per plate of 12.5 grams weight. After closing the mold by applying pressure for the first time, the mold is opened and excess material which has spread over portions of the denture which are not to be lined is removed. Molding is repeated by application of pressure, and polymerization is performed as described in Example 1. After removal from the mold a lower denture is obtained which is provided at the gum-engaging portion of the denture with a strongly adhering, soft, resilient lining which does not show any rise of the bite and conforms exactly to the surface of the mold.

*Example 3*

A full lower denture is provided with a soft, resilient lining as described in Example 1. The soft plate is prepared as follows: a 0.5 mm. thick plate prepared from a co-polymer of 35:64:1 methyl methacrylate/butyl acrylate/hexanediol dimethacrylate is uniformly sprayed superficially with a solution of benzene peroxide in ethyl acetate by means of a spray pistol in such a manner that 0.1 gram of benzoyl peroxide is applied to 6 grams of the soft material. The plate is dried and covered with a 0.5 mm. thick plate of equal size prepared from the same material; the two plates are then pressed together under slight pressure. The united plate of 12.5 grams weight is swelled with 5 cc. of a monomeric mixture consisting of 59 parts of methyl methacrylate, 40 parts of isohexyl acrylate and 1 part of butanediol dimethacrylate and the plate thus plasticized is used for making liners as described in Example 1. After removal from the mold a denture with a strongly adhering soft, resilient lining is obtained.

*Example 4*

A partial lower denture with a soft, resilient lining is produced as described in Example 2. A 1 mm. thick plate prepared from a co-polymer of 40 parts of methyl methacrylate and 60 parts of dodecyl acrylate is used as the soft resilient plate. This plate is swelled with a monomeric mixture consisting of 59 parts of methyl methacrylate, 40 parts of dodecyl acrylate, and 1 part of ethylene glycol dimethacrylate, which contains 0.1 gram of benzoyl peroxide per 5 cc. of mixture. 5 cc. of the monomeric mixture are used to 12.5 grams of the soft plate. After removal from the mold a denture with a strongly adhering, soft, resilient lining is obtained.

*Example 5*

A full upper denture is provided with a partial liner as described in Example 1. A 1 mm. thick plate prepared from a co-polymer consisting of 20 parts of dodecyl acrylate, 40 parts of methyl methacrylate and 40 parts of butyl acrylate is used as the soft plate and is swelled with a monomeric mixture of 60 parts of dodecyl acrylate and 40 parts of methyl methacrylate, which contains 0.1 gram of benzoyl peroxide per 5 cc. of mixture. 5 cc. of the monomeric mixture are applied per 12.5 grams of soft plate. After removal from the mold a denture with a strongly adhering, soft lining is obtained.

*Example 6*

A full lower denture with a soft, resilient lining is obtained by following the procedure of Example 1. A 1 mm. thick plate prepared from a co-polymer of 35 parts of methyl methacrylate, 64.2 parts of butyl acrylate and 0.8 part of ethylene glycol diacrylate is used as the soft plate, and this is swelled with isohexyl methacrylate containing 0.1 gram of benzoyl peroxide per 5 cc. 5 cc. of the monomeric mixture are used to 12.5 grams of the soft plate. After removal from the mold a denture with a strongly adhering, soft, resilient lining is obtained.

*Example 7*

A full lower denture with a soft resilient lining is produced by following the procedure of Example 1. A 1 mm. thick plate prepared from a co-polymer of 35 parts of methyl methacrylate, 64.8 parts of butyl acrylate and 0.2 part of divinyl benzene is employed as the soft plate, and this is swelled with a monomeric mixture consisting of 97 parts of isobutyl methacrylate and 3 parts of ethylene glycol dimethacrylate, which contains 0.1 gram of dissolved benzoyl peroxide per 5 cc. of mixture. After removal from the mold a denture with a strongly adhering, soft, resilient lining is obtained.

Example 8

A full lower denture with a soft, resilient lining is produced by following the procedure of Example 1. A 1 mm. thick plate prepared from a co-polymer of 35 parts of methyl methacrylate, 64.2 parts of butyl acrylate, and 0.8 part of ethylene glycol dimethacrylate is employed as the soft plate. This plate is swelled with a monomeric mixture consisting of 97 parts of butyl methacrylate and 3 parts of ethylene glycol dimethacrylate, which contains 0.1 gram of dissolved benzoyl peroxide per 5 cc. of mixture. 5 cc. of the monomeric mixture are used for swelling 12.5 grams of plate. After removal from the mold a denture with a strongly adhering, soft, resilient lining is obtained.

I claim:

1. A process of producing a plastic denture having a soft resilient lining which comprises the steps of (1) forming a hard resinous body portion in the shape of a denture having a gum-engaging surface, (2) applying to said gum-engaging surface a thin, self-supporting plate of a soft resilient copolymer derived from (a) methyl methacrylate and (b) an unsaturated ester yielding soft plastics, selected from the group consisting of aliphatic esters of acrylic acid, the alcohol radical of which has 1–15 carbon atoms, and aliphatic esters of methacrylic acid, the alcohol radical of which has 4–15 carbon atoms, (3) applying at least one compatible monomeric liquid polymerizable unsaturated ester to said thin, self-supporting plate in an amount sufficient to induce swelling, and then (4) subjecting the resulting assembly to polymerizing conditions to form a hard-bodied denture having a soft resilient gum-engaging portion integrally secured thereto.

2. Process of claim 1 wherein the monomeric polymerizable unsaturated ester is selected from the group consisting of esters of acrylic acid and esters of methacrylic acid, which esters form polymers compatible with and strongly adhering to the body portion of the denture.

3. The process of claim 1 wherein the soft resilient plastic plate is a copolymer of methyl methacrylate and butyl acrylate.

4. The process of claim 1 wherein the soft resilient plastic plate is a copolymer of methyl methacrylate and dodecyl acrylate.

5. The process of claim 1 wherein the thin, self-supporting plate is made of a cross-linked copolymer.

6. Process of claim 5 wherein the liquid polymerizable monomeric unsaturated ester contains a cross-linking agent.

7. Process of claim 6 wherein the cross-linking agent is, in each case, an acrylic acid ester of a lower alkane diol.

8. Process of claim 6 wherein the cross-linking agent is, in each case, glycol dimethacrylate.

9. A denture assembly consisting essentially of a hard resinous body portion and a soft lining containing a copolymer of methyl methacrylate and a monomer selected from the group consisting of (1) an acrylic acid ester, the alcohol radical of which has 1–15 carbon atoms, and (2) a methacrylic acid ester, the alcohol radical of which has 4–15 carbon atoms.

10. The denture of claim 9 wherein the soft lining is a copolymer prepared from methyl methacrylate and butyl acrylate.

11. The denture of claim 9 wherein the soft lining is a copolymer prepared from methyl methacrylate and dodecyl acrylate.

References Cited in the file of this patent

UNITED STATES PATENTS

| | | |
|---|---|---|
| 2,234,993 | Vernon et al. | Mar. 18, 1941 |
| 2,320,533 | Muskat | June 1, 1943 |
| 2,341,593 | Burkhardt | Feb. 15, 1944 |
| 2,496,387 | Fink | Feb. 7, 1950 |
| 2,569,767 | Knock | Oct. 2, 1951 |
| 2,645,012 | Hetzel | July 14, 1953 |